(12) United States Patent
Hoch

(10) Patent No.: US 9,649,798 B2
(45) Date of Patent: May 16, 2017

(54) LINING PART AND METHOD FOR PRODUCING A LINING PART

(75) Inventor: Johanna Hoch, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 571 days.

(21) Appl. No.: 14/240,559

(22) PCT Filed: Aug. 29, 2012

(86) PCT No.: PCT/EP2012/003619
§ 371 (c)(1),
(2), (4) Date: Feb. 24, 2014

(87) PCT Pub. No.: WO2013/029783
PCT Pub. Date: Mar. 7, 2013

(65) Prior Publication Data
US 2014/0225298 A1    Aug. 14, 2014

(30) Foreign Application Priority Data

Sep. 1, 2011    (DE) .................. 10 2011 112 135

(51) Int. Cl.
B29C 45/14 (2006.01)
B32B 21/04 (2006.01)
(Continued)

(52) U.S. Cl.
CPC ...... B29C 45/14508 (2013.01); B32B 21/045 (2013.01); B60R 13/0256 (2013.01);
(Continued)

(58) Field of Classification Search
CPC ..... B60R 13/01; B60R 13/02; B60R 13/0212; B60R 13/0218; B60R 13/0237; B60R 13/0262; B60R 13/0268; B60R 13/04; B60R 2013/0287; B60R 2013/0293; B60R 2013/046; B32B 2037/744; B32B 21/045; B32B 2605/08; B29C 45/14508; B29C 2045/14516
(Continued)

(56) References Cited

U.S. PATENT DOCUMENTS

| | | | | |
|---|---|---|---|---|
| 4,592,583 A | * | 6/1986 | Dresen | ............. B60R 13/01 296/39.2 |
| 4,693,507 A | * | 9/1987 | Dresen | ............. B60R 13/01 296/39.2 |

(Continued)

FOREIGN PATENT DOCUMENTS

| CN | 1621276 | 6/2005 |
|---|---|---|
| CN | 201559559 | 8/2010 |

(Continued)

OTHER PUBLICATIONS

English Abstract for Brun (FR 2692531), published on Dec. 24, 293.*

(Continued)

*Primary Examiner* — Seyed Masoud Malekzadeh
(74) *Attorney, Agent, or Firm* — Staas & Halsey LLP

(57) ABSTRACT

A lining part, in particular for the interior of a motor vehicle, has a base body which is formed of a wood material. Slip-prevention elements which have a higher adhesion force than the surface of the base body are located on the surface of the base body.

12 Claims, 1 Drawing Sheet

(51) Int. Cl.
- B60R 13/04 (2006.01)
- B60R 13/02 (2006.01)
- B60R 13/01 (2006.01)
- B60R 11/00 (2006.01)

(52) U.S. Cl.
CPC ...... *B60R 13/0262* (2013.01); *B29C 2045/14516* (2013.01); *B32B 2307/712* (2013.01); *B32B 2307/744* (2013.01); *B32B 2605/08* (2013.01); *B60R 13/01* (2013.01); *B60R 13/02* (2013.01); *B60R 13/0212* (2013.01); *B60R 13/0218* (2013.01); *B60R 13/0237* (2013.01); *B60R 2011/0077* (2013.01); *B60R 2013/0287* (2013.01); *B60R 2013/0293* (2013.01); *B60R 2013/046* (2013.01)

(58) Field of Classification Search
USPC .......................................................... 264/161
See application file for complete search history.

(56) References Cited

U.S. PATENT DOCUMENTS

| | | | | |
|---|---|---|---|---|
| 4,750,776 | A * | 6/1988 | Barben | B60R 13/01 296/39.2 |
| 5,370,436 | A * | 12/1994 | Martindale | B60R 13/01 296/39.2 |
| 5,505,512 | A * | 4/1996 | Martindale | B60R 13/01 296/39.2 |
| 7,398,991 | B2 | 7/2008 | Hayashi et al. | |

FOREIGN PATENT DOCUMENTS

| | | |
|---|---|---|
| DE | 29912270 U1 | 1/2001 |
| DE | 19938184 A1 | 2/2001 |
| DE | 20305142 U1 | 6/2003 |
| DE | 102007028711 A1 | 12/2008 |
| DE | 102007031334 A1 | 1/2009 |
| DE | 102008016078 | 10/2009 |
| DE | 10 2011 112 135.1 | 1/2011 |
| DE | 102009036680 A1 | 2/2011 |
| EP | 1346879 A1 | 9/2003 |
| FR | 2692531 A1 * | 12/1993 ............ B60R 13/01 |
| FR | 2868733 A1 | 10/2005 |
| WO | PCT/EP2012/003619 | 8/2012 |

OTHER PUBLICATIONS

English Abstract for Eyer et al. (DE 10 2007 028 711), published on Jun. 21, 2007.*
English Abstract for Brun (FR 2692531), published on Dec. 24, 1993.*
Office Action mailed Mar. 10, 2016 in Chinese Patent Application No. 201280041186.4.
WIPO English Language Translation of the International Preliminary Report on Patentability for PCT/EP2012/003619, mailed Mar. 6, 2014, 5 pages.
Chinese Office Action for related Chinese Patent Application No. 201280041186.4, issued Jul. 3, 2015, 6 pages.
European Office Action for related European Patent Application No. 12 756 099.3, issued Oct. 9, 2015, 4 pages.
German Examination Report dated Feb. 25, 2016 in corresponding German Patent Application No. 102011112135.1.
German Office Action for German Priority Patent Application No. 10 2011 112 135.1, issued Aug. 2, 2012, 5 pages.
International Search Report mailed Nov. 7, 2012 in corresponding International Patent Application No. PCT/EP2012/003619.

* cited by examiner

LINING PART AND METHOD FOR PRODUCING A LINING PART

CROSS REFERENCE TO RELATED APPLICATIONS

This application is based on and hereby claims priority to International Application No. PCT/EP2012/003619 filed on Aug. 29, 2012 and German Application No. 10 2011 112 135.1 filed on Sep. 1, 2011, the contents of which are hereby incorporated by reference.

BACKGROUND

The invention relates to a method for producing a trim part.

A decorative part having a multiple-piece surface, the surface parts of which penetrate one another mutually, is known from DE 10 2007 028 711 A1. Said document also describes that it is possible to overmold the decorative panel with an injection molding material.

FR 2 868 733 A1 describes a material which is suitable as inner lining of an automobile and has a decorative wooden sheet with a covering layer made from a transparent thermoplastic material on the visible side and a thermoplastic covering layer on the rear side.

A further trim part is known from DE 299 12 270 U1. In particular in motor vehicles of the medium and luxury class, wooden materials are used very frequently in the interior on account of their visually and haptically high-quality effect. These are usually trim parts which are arranged in a vertical or at least approximately vertical plane, since wooden surfaces are usually very smooth and objects which are arranged on a horizontal wooden surface can slide very easily and in the process can also damage the wooden surface.

DE 10 2009 036 680 A1 describes a motor-vehicle interior trim having a wooden or veneer element which has a lamination and an engraved design which penetrates the lamination. The engraved design is intended to impart a decorative surface to the wooden veneer element. However, this is a very complicated process which causes high costs and can therefore only be used in vehicles located in the highest price segment.

SUMMARY

It is therefore an object of the present invention to provide a method for producing a trim part, which method is associated with comparatively low outlay.

The inventor proposes a method for producing a method for producing a trim part, in particular for the interior of a motor vehicle, anti-slip elements being attached to a main body which is composed of a wooden material, which anti-slip elements have a greater static friction than the surface of the main body, recesses being made in the main body, the anti-slip elements being introduced into the recesses, and the main body having respective edges which protrude beyond the recesses in the longitudinal direction and are severed after the introduction of the anti-slip elements into the recesses. The method for producing the trim part which is particularly simple and suitable for series production, by way of which method the advantages with regard to the improved adhesion and the resulting staying in position of objects on the trim part even during driving can be achieved.

The method produces a trim part, in which the anti-slip elements run over the entire main body in the longitudinal direction and do not end until the edges of said main body.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
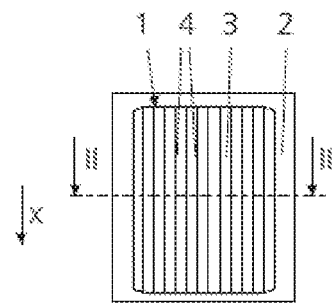
FIG. 1 shows a plan view of a trim part according to one potential embodiment of the inventor's proposal, which is installed in the interior of a motor vehicle.

Reference will now be made in detail to the preferred embodiments of the present invention, examples of which are illustrated in the accompanying drawings, wherein like reference numerals refer to like elements throughout.

FIG. 1 shows a plan view of a trim part 1 which is provided, in particular, for the interior of a motor vehicle, the entirety of which is not shown. In the present case, the trim part 1 is configured as a bearing face of the center console 2 (shown very diagrammatically) of the motor vehicle and is arranged in a substantially horizontally oriented plane. In principle, it is possible, however, to also attach the trim part 1 at other locations of the interior and to arrange it in a differently oriented plane.

It is apparent from FIG. 1 that the trim part 1 has a main body 3 which, in the present case, is composed of a wooden material, for example of a veneer. A plurality of anti-slip elements 4 which run parallel to one another in the longitudinal direction which is denoted by "x" are situated on the surface of the main body 3, which anti-slip elements 4 have a greater static friction than the surface of the main body 3. The anti-slip elements 4 are therefore configured in the form of strips which run at least approximately in a straight line, which results in the visual appearance of a sliced veneer. The anti-slip elements 4 are preferably composed of a rubber-like plastic which ensures a sufficient adhesion of objects which are mounted on the surface of the trim part 1. However, other, in particular adhesive, materials may also be suitable for the anti-slip elements 4, in order to achieve a greater adhesion than that of the surface of the main body 3.

Figure 2:
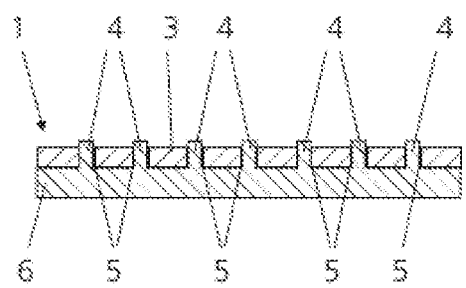
FIG. 2 shows a section according to the line II-II from FIG. 1.

It can be seen in FIG. 2 that the main body 3 has a plurality of slot-like recesses 5 which are arranged next to one another and in which the anti-slip elements 4 are arranged. In the present case, the main body 3 is overmolded with the material which forms the anti-slip elements 4, and the anti-slip elements 4 penetrate the recesses 5. Here, all the anti-slip elements 4 are connected to one another via a carrier body 6 which is situated behind the main body 3 of the trim part 1. The carrier body 6 imparts a certain cohesion to the trim part 1. Furthermore, it is apparent from this section according to FIG. 2 that the anti-slip elements 4 protrude beyond the surface of the main body 3, which results in a particularly satisfactory adhesion affect.

During the production of the trim part 1, the anti-slip elements 4 are in principle attached to the main body 3, the main body 3 preferably being overmolded with the material which forms the anti-slip elements 4. The material which forms the anti-slip elements 4 penetrates the recesses 5 and so much material is preferably overmolded that the anti-slip elements 4 protrude beyond the surface of the main body 3. To this end, the main body 3 can be inserted into a mold (not shown) which has corresponding recesses for receiving the material which forms the anti-slip elements 4. In the present case, in which all the anti-slip elements 4 are connected to one another via the carrier body 6, the main body 3 is also overmolded with the material, preferably with a rubber-like plastic, which forms the carrier body 6.

The recesses 5 are preferably made in the main body 3 before the latter is overmolded, for example by milling or another suitable process. The anti-slip elements 4 are subsequently introduced into the recesses 5.

Figure 3:
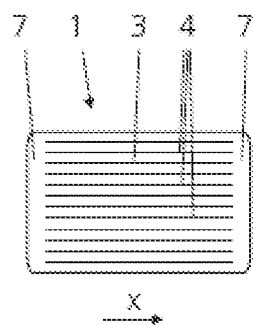
FIG. 3 shows a first state of the trim part during one potential embodiment of the proposed method for producing it.
Figure 4:
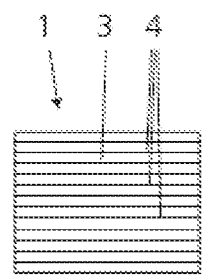
FIG. 4 shows a second state of the trim part during one potential embodiment of the proposed method for producing it.

It is apparent from FIG. 3 that the main body 3 has respective edges 7 which protrude beyond the recesses 5 in the longitudinal direction x and are severed after the introduction of the anti-slip elements 4 into the recesses 5, which severing can be carried out, for example, by sawing or milling. As a result, the trim part 1 which is shown in FIG. 4 is obtained, in which trim part 1 the anti-slip elements 4 run over the entire main body 3 in the longitudinal direction x and do not end until the edges of said main body 3.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for producing a trim part, for an interior of a motor vehicle, comprising:
    providing a main body formed of a wood material, the main body having a surface;
    forming recesses in the main body such that the main body has edges which protrude beyond the recesses in a longitudinal direction;
    attaching anti-slip elements to the main body by introducing the anti-slip elements into the recesses in the main body, the anti-slip elements having a greater static friction than the surface of the main body;
    after introducing the anti-slip elements, severing the edges of the main body which protrude beyond the recesses in the longitudinal direction, wherein
    the recesses extend in the longitudinal direction up to the edges of the main body, and
    after the edges of the main body are severed, the recesses extend to ends of the main body.

2. The method as claimed in claim 1, wherein
    the main body is overmolded with a material which forms the anti-slip elements, and
    the material which forms the anti-slip elements penetrates the recesses.

3. The method as claimed in claim 1, wherein
    the main body has a passenger-compartment-exposed surface and a mounting surface,
    the anti-slip elements have a greater static friction than the passenger-compartment-exposed surface,
    injection molding is used to introduce the anti-slip elements into the recesses in the main body,
    during injection molding, a material which forms the anti-slip elements is injected from mounting surface side of the main body,
    the recesses extend through the main body, from the passenger-compartment-exposed surface to the mounting surface,
    injection molding is performed using a mold which has cavities corresponding to the recesses in the main body, and
    the cavities are filled with the material which forms the anti-slip elements during injection molding such that after injection molding, the anti-slip elements protrude from the passenger-compartment-exposed surface of the main body.

4. The method as claimed in claim 3, wherein
    the recesses are substantially parallel strips.

5. The method as claimed in claim 1, wherein
    the main body has a passenger-compartment-exposed surface and a mounting surface, and
    the anti-slip elements have a greater static friction than the passenger-compartment-exposed surface.

6. The method as claimed in claim 5, wherein
    the recesses extend through the main body, from the passenger-compartment-exposed surface to the mounting surface.

7. The method as claimed in claim 5, wherein
    injection molding is used to introduce the anti-slip elements into the recesses in the main body, and
    during injection molding, a material which forms the anti-slip elements is injected from a mounting surface side of the main body.

8. The method as claimed in claim 7, wherein
    the recesses extend through the main body, from the passenger-compartment-exposed surface to the mounting surface,
    injection molding is performed using a mold which has cavities corresponding to the recesses in the main body, and
    the cavities are filled with the material which forms the anti-slip elements during injection molding such that after injection molding the anti-slip elements protrude from the passenger-compartment-exposed surface of the main body.

9. The method as claimed in claim 5,
    wherein anti-slip elements protrude from the passenger-compartment-exposed surface.

10. The method as claimed in claim 1, wherein
    the anti-slip elements are formed of a synthetic rubber.

11. The method as claimed in claim 1, wherein
    the recesses are substantially parallel strips.

12. The method as claimed in claim 1, wherein
    the main body is a veneer, and
    a sliced veneer is produced when the recesses are formed in the main body.

* * * * *

UNITED STATES PATENT AND TRADEMARK OFFICE
CERTIFICATE OF CORRECTION

Page 1 of 1

PATENT NO. : 9,649,798 B2
APPLICATION NO. : 14/240559
DATED : May 16, 2017
INVENTOR(S) : Johanna Hoch It is certified that error appears in the above-identified patent and that said Letters Patent is hereby corrected as shown below:

On the Title Page

Subheading "Other Publications"
Column 2, Line 28, Delete "293." and insert -- 1993. --, therefore.

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*